US012014592B2

(12) United States Patent
Deemter et al.

(10) Patent No.: US 12,014,592 B2
(45) Date of Patent: *Jun. 18, 2024

(54) SYSTEM AND METHOD FOR DISPENSING A FOOD PRODUCT

(71) Applicant: Little Caesar Enterprises, Inc., Detroit, MI (US)

(72) Inventors: Kent A. Deemter, Hudsonville, MI (US); R. William Kneifel, II, West Bloomfield, MI (US); David Scrivano, South Lyon, MI (US); Christopher P. Ilitch, Bloomfield Hills, MI (US)

(73) Assignee: Little Caesar Enterprises, Inc., Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/682,857

(22) Filed: Feb. 28, 2022

(65) Prior Publication Data

US 2022/0189237 A1 Jun. 16, 2022

Related U.S. Application Data

(63) Continuation of application No. 16/704,301, filed on Dec. 5, 2019, now Pat. No. 11,282,328.

(Continued)

(51) Int. Cl.

*G07F 17/00* (2006.01)

*G07F 9/10* (2006.01)

(52) U.S. Cl.

CPC .......... *G07F 17/0078* (2013.01); *G07F 9/105* (2013.01)

(58) Field of Classification Search

CPC .................................................. G07F 17/0078

See application file for complete search history.

(56) References Cited

U.S. PATENT DOCUMENTS

| | | | |
|---|---|---|---|
| 5,168,795 | A | 12/1992 | Okada |
| 5,503,300 | A | 4/1996 | Prescott et al. |

(Continued)

FOREIGN PATENT DOCUMENTS

| | | | |
|---|---|---|---|
| GB | 1170051 | A | 11/1969 |
| GB | 2134503 | A | 8/1984 |

(Continued)

OTHER PUBLICATIONS

Intellectual Property India Patent Office, Examination Report for Application No. 202147024689 dated Mar. 1, 2022.

(Continued)

*Primary Examiner* — Gene O Crawford

*Assistant Examiner* — Ayodeji T Ojofeitimi

(74) *Attorney, Agent, or Firm* — Honigman LLP

(57) ABSTRACT

A food management system includes a cabinet having a chamber, a lift, and an ejector. The chamber is defined, in part, by a front wall including a chute defining a first end of a dispensing region along the cabinet. At least one lift is disposed within the chamber, and is configured to receive a plurality of containers therein. The lift is operable to sequentially present at least one of the containers to the dispensing region of the cabinet. The ejector includes a bumper disposed within the dispensing region. The bumper is operable to translate through the dispensing region from a retracted position on an opposite side of the at least one lift from the chute, to an extended position between the retracted position and the chute to bias the at least one of the containers from the at least one lift through the chute.

20 Claims, 10 Drawing Sheets

Related U.S. Application Data

(60) Provisional application No. 62/776,002, filed on Dec. 6, 2018.

(56) References Cited

U.S. PATENT DOCUMENTS

| | | | |
|---|---|---|---|
| 5,676,051 | A | 10/1997 | Sinemus |
| 6,209,447 | B1 | 4/2001 | Ewald et al. |

FOREIGN PATENT DOCUMENTS

| | | | |
|---|---|---|---|
| JP | H09147224 | A | 6/1997 |
| JP | 2006081775 | A | 3/2006 |
| KR | 101913066 | B1 | 10/2018 |

OTHER PUBLICATIONS

European Patent Office, Extended European Search Report for Application 19893623.9 dated Jul. 25, 2022.
International Search Report for International Application No. PCT/US2019/064584 dated Apr. 1, 2020.
USPTO, Office Action for U.S. Appl. No. 16/704,301 dated Feb. 4, 2021.
USPTO, Office Action for U.S. Appl. No. 16/704,301 dated Jul. 13, 2021.
USPTO, Office Action for U.S. Appl. No. 16/704,301 dated Oct. 7, 2021.

SYSTEM AND METHOD FOR DISPENSING A FOOD PRODUCT

CROSS-REFERENCE TO RELATED APPLICATION

This application is a continuation of U.S. patent application Ser. No. 16/704,301, filed Dec. 5, 2019, which claims the benefit of priority from U.S. Provisional Application Ser. No. 62/766,002 filed on Dec. 6, 2018, the entire content of which is incorporated herein by reference in its entirety.

TECHNICAL FIELD

This disclosure relates to a system and method for managing the dispensing of a food product, and more particularly to a system and method for managing the dispensing of a food product.

BACKGROUND

This section provides background information related to the present disclosure and is not necessarily prior art. Food delivery services are often provided by food service providers, restaurants, and third-party delivery services to deliver various food products to customers at remote locations. Typically, food delivery is a manual process, requiring a delivery person to load individual food orders into a vehicle, to drive the vehicle to the desired destination, and to dispense or deliver the food to the customer's location from the delivery vehicle. However, as vehicles become increasingly more autonomous and eliminate the need for a dedicated delivery driver, a need for providing automated dispensing of food products from the delivery vehicle has arisen.

SUMMARY

This section provides a general summary of the disclosure, and is not a comprehensive disclosure of its full scope or all of its features.

One aspect of the disclosure provides a food management system comprising a cabinet having a chamber defined by a plurality of walls including a base, a top wall disposed on an opposite side of the cabinet from the base, a front wall extending from the base to the top wall, a rear wall disposed on an opposite side of the cabinet from the front wall, a left wall extending from the base to the top wall and from the front wall to the rear wall, and a right wall formed on an opposite side of the cabinet from the left wall. The front wall of the cabinet includes a chute defining a first end of a dispensing region along the cabinet. The food management system further includes at least one lift disposed within the chamber. The lift is configured to receive a plurality of containers therein and operable to sequentially present at least one of the containers to the dispensing region of the cabinet. An ejector of the food management system includes a bumper disposed within the dispensing region. The bumper is operable to translate through the dispensing region from a retracted position on an opposite side of the at least one lift from the chute to an extended position between the retracted position and the chute to bias the at least one of the containers from the at least one lift through the chute.

Implementations of the disclosure may include one or more of the following optional features. In some implementations, the at least one lift includes a first lift disposed adjacent to the front wall and a second lift disposed on an opposite side of the first lift from the front wall. Here, the food management system may include a gate disposed between the first lift and the second lift. Optionally, the first lift may include a first elevator having a first plurality of slots and a second elevator opposing the first elevator and including a second plurality of slots, whereby each of the first plurality of slots cooperates with one of the second plurality of slots to receive one of the containers. In some implementations, each of the first elevator and the second elevator is a conveyor belt including a plurality of paddles defining a support surface of one of the slots.

In some examples, the ejector includes a belt extending from a first end adjacent to the rear wall to a second end adjacent to the front wall, the bumper being attached to the belt.

In some implementations, the chute is disposed at a first end of the front wall adjacent to the top wall and defines a passage through the front wall configured to receive one of the containers therethrough.

In some examples, the food management system comprises a warmer disposed within the chamber. Here, the warmer includes a first heating unit disposed on the left wall and a second heating unit disposed on the right wall. Each of the first heating unit and the second heating unit include an outlet adjacent to the base of the cabinet and an intake adjacent to the top wall of the cabinet, whereby the intake and the outlet of the first heating unit oppose the intake and the outlet of the second heating unit.

In some implementations, the front wall includes a removable access panel.

Another aspect of the disclosure provides a food management system having a cabinet having a chamber defined by a plurality of walls including a base, a top wall disposed on an opposite side of the cabinet from the base, a front wall extending from the base to the top wall, a rear wall disposed on an opposite side of the cabinet from the front wall, a left wall extending from the base to the top wall and from the front wall to the rear wall, and a right wall formed on an opposite side of the cabinet from the left wall, the front wall of the cabinet including a chute defining first end of a dispensing region along the cabinet. The food management system includes at least one lift disposed within the chamber. The lift includes a plurality of slots each configured to receive a container therein, the slots operable to vertically translate the containers into the dispensing region, whereby one of the slots defines a support surface of the dispensing region. The food management system further includes an ejector having a bumper operable to translate through the dispensing region to bias the container of the at least one lift towards the chute. This aspect may include one or more of the following optional features.

In some implementations, the at least one lift includes a first lift disposed adjacent to the front wall and a second lift disposed on an opposite side of the first lift from the front wall. Here, the food management system my further include a gate disposed between the first lift and the second lift.

In some examples, the first lift includes a first elevator having a first plurality of slots and a second elevator opposing the first elevator and including a second plurality of slots, whereby each of the first plurality of slots cooperates with one of the second plurality of slots to receive the container. Optionally, each of the first elevator and the second elevator is a conveyor belt including a plurality of paddles defining a support surface of one of the slots.

In some implementations, the ejector includes a belt extending from a first end adjacent to the rear wall to a second end adjacent to the front wall, the bumper attached to the belt. In some examples, the chute is disposed at a first end of the front wall adjacent to the top wall and defines a passage through the front wall configured to receive the container therethrough.

In some implementations, the food management system comprises a warmer disposed within the chamber. Here, the warmer includes a first heating unit disposed on the left wall and a second heating unit disposed on the right wall, each of the first heating unit and the second heating unit including an outlet adjacent to the base of the cabinet and an intake adjacent to the top wall of the cabinet, whereby the intake and the outlet of the first heating unit oppose the intake and the outlet of the second heating unit.

In some examples, the front wall includes a removable access panel.

In another aspect of the disclosure, a method of dispensing a container comprises providing a food management system including: a cabinet having a first end and a chute formed in a side wall at the first end; at least one lift disposed within the cabinet and having a first plurality of slots configured to receive a container and operable to translate along a first direction towards the first end; and an ejector disposed at the first end of the cabinet and having a bumper operable to translate in a second direction transverse to the first direction and towards the chute. The method further includes receiving one or more containers in the slots of the at least one lift, translating the at least one lift in the first direction to present a first one of the containers to the ejector, and translating the bumper in the second direction to bias the first one of the containers through the chute of the cabinet.

In some examples, after the first one of the containers is biased through the chute, the at least one lift is translated in the first direction to present a second one of the containers to the ejector. Here, the bumper is translated in the second direction to bias the second one of the containers through the chute of the cabinet.

In some implementations, the at least one lift includes a first lift having a first plurality of slots and a second lift having a second plurality of slots, the method including receiving a first plurality of containers having first ingredients in the slots of the first lift and receiving a second plurality of containers having second ingredients on the second lift.

The details of one or more implementations of the disclosure are set forth in the accompanying drawings and the description below. Other aspects, features, and advantages will be apparent from the description and drawings, and from the claims. The description and specific examples in this summary are intended for purposes of illustration only and are not intended to limit the scope of the present disclosure.

DESCRIPTION OF DRAWINGS

The drawings described herein are for illustrative purposes only of selected configurations and not all possible implementations, and are not intended to limit the scope of the present disclosure.

Like reference symbols in the various drawings indicate like elements.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1:
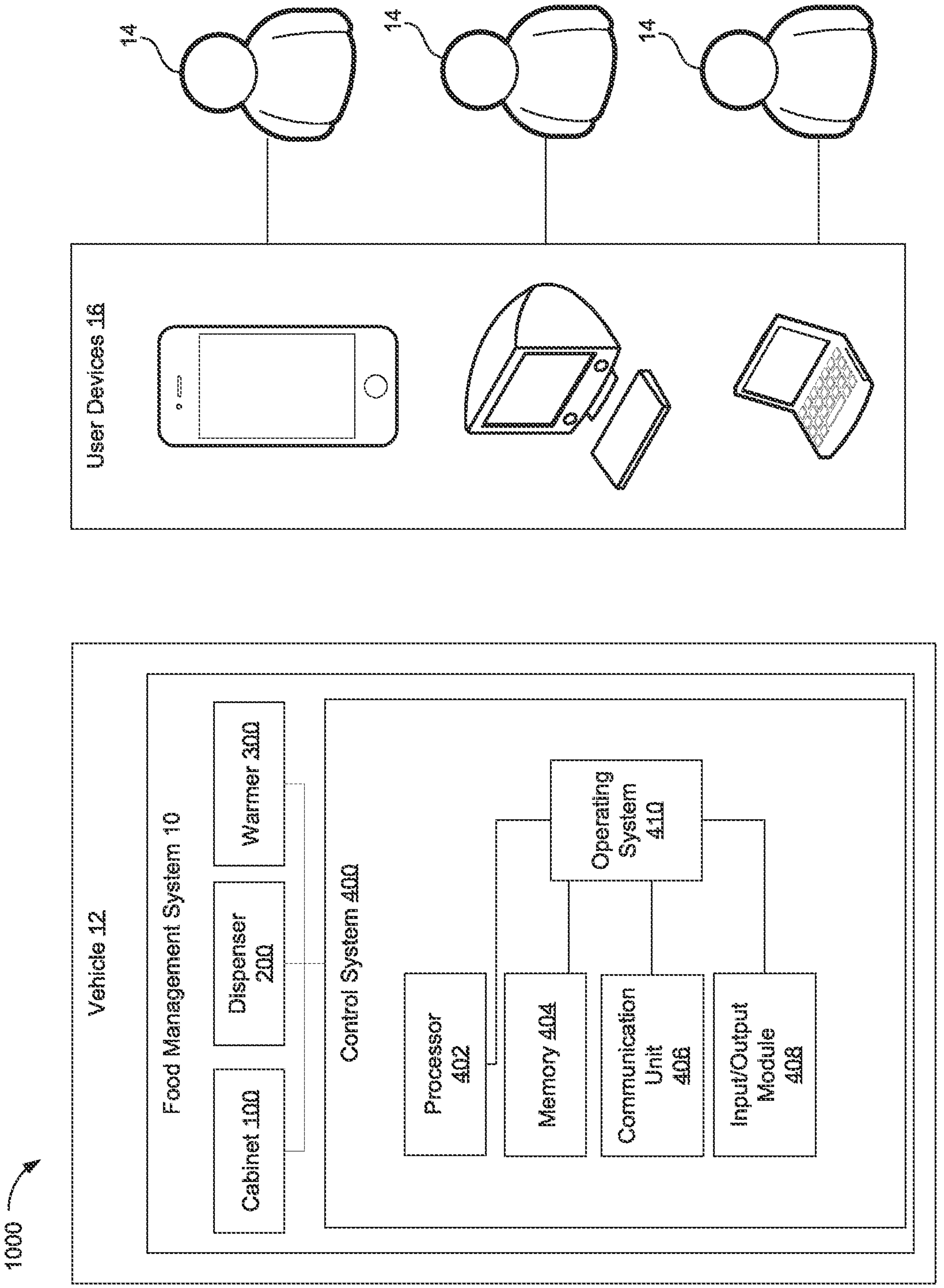
FIG. 1 is a schematic view of a food distribution environment according to the principles of the present disclosure.

Referring to FIG. 1, a food distribution environment 1000 includes a food management system 10, which may be disposed within a delivery vehicle 12. In other examples, the food management system 10 may be incorporated into a stationary structure, such as a store or kiosk. Generally, the food management system 10 is configured to receive, maintain, and dispense containers C for food products. The food distribution environment 1000 further includes a plurality of users 14 in communication with the food management system 10 via user devices 16.

Figure 2:
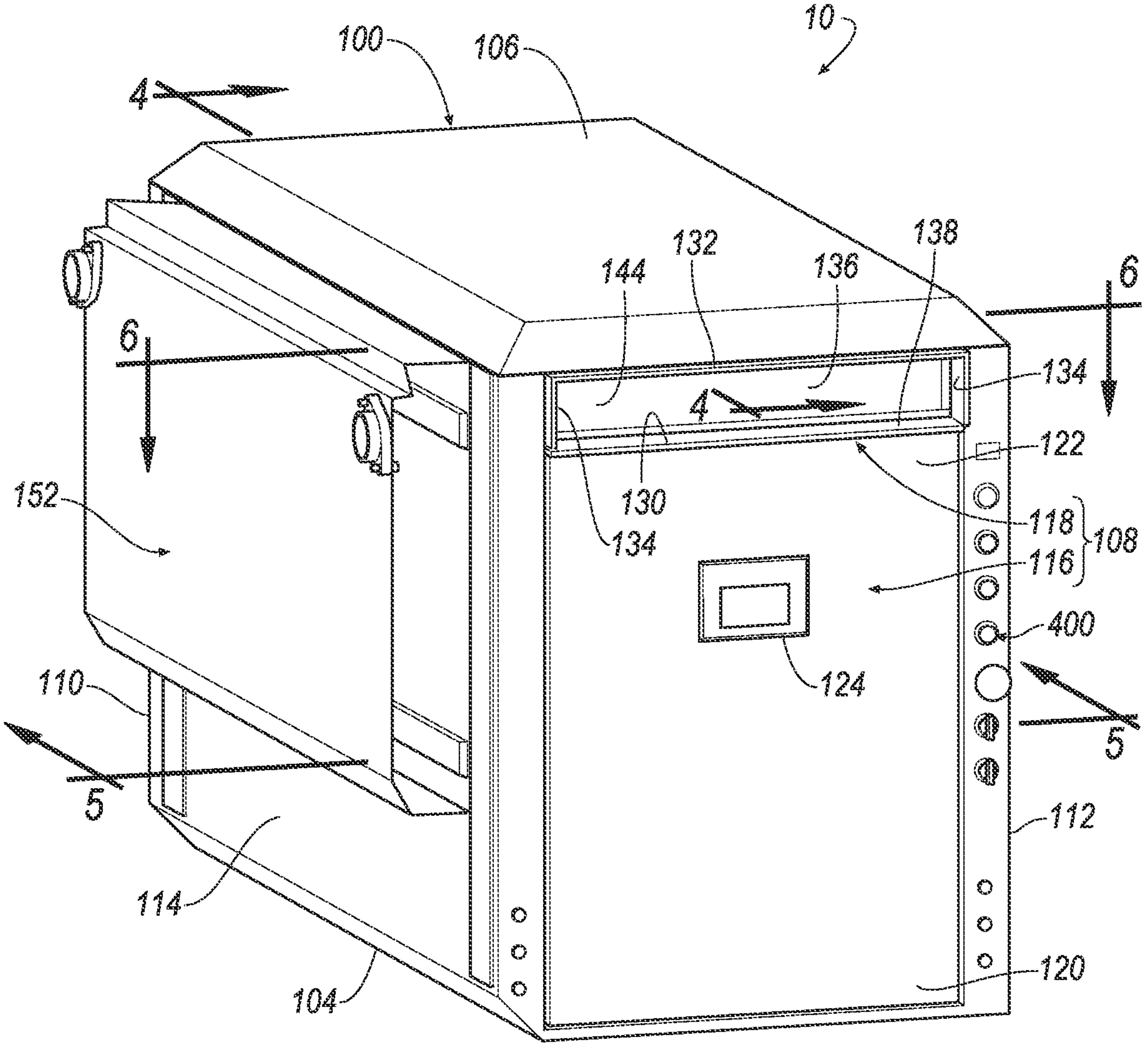
FIG. 2 is a perspective view of a food management system of the food distribution environment of FIG. 1.

Referring to FIG. 2, the food management system 10 according to the instant disclosure includes a cabinet 100 defining a chamber 102. The food management system 10 further includes a distribution system 200, a warmer 300 disposed within the chamber, and a control system 400 configured to manage the operation of each of the distribution system 200 and the warmer 300.

In the illustrated example, the cabinet 100 is box-shaped and includes a plurality of walls 104, 106, 108, 110, 112, 114 defining the chamber 102. As shown, the cabinet 100 includes a base 104 and a top wall 106 disposed on an opposite side of the cabinet 100 from the base 104. A front wall 108 extends from the base 104 to the top wall 106. A rear wall 110 is disposed on an opposite side of the cabinet 100 from the front wall 108 and extends from the base 104 to the top wall 106. A left wall 112 extends from the base 104 to the top wall 106 and from the front wall 108 to the rear wall 110. Similarly, a right wall 114 is disposed on an opposite side of the cabinet 100 from the left wall 112 and extends from the base 104 to the top wall 106 and from the front wall 108 to the rear wall 110.

With reference to FIG. 2, the front wall 108 of the cabinet 100 includes a removable access panel 116 and a chute 118. As shown, the access panel 116 defines a lower portion or first end of the front wall 108 and extends from a bottom end 120 proximate to the base 104 to a top end 122 intermediate the base 104 and the top wall 106. Accordingly, the top end 122 of the access panel 116 is spaced apart from the top wall 106.

As used herein, the term "removable" means that the access panel 116 can be detached and reattached to the cabinet 100 without the use of tools. For example, the access panel 116 may be removably attached to the cabinet 100 using fasteners, such as clips, magnets, or snaps, for example. Accordingly, the access panel 116 may include a handle 124 configured for grasping the access panel 116 when the access panel 116 is installed on the cabinet 100, thereby facilitating the removal and replacement of the access panel 116 without the use of tools. In other examples, the access panel 116 may not be fully removable, but may be hingedly or pivotally attached to the cabinet 100, whereby the access panel 116 can be rotated or swung to an open position to allow access to the interior of the chamber 102.

Referring still to FIG. 2, the chute 118 is disposed between the top wall 106 and the top end 122 of the access panel 116. As shown, the chute 118 comprises a bottom wall 130 disposed adjacent to the top end 122 of the access panel 116 and a top wall 132 spaced apart from the bottom wall 130 and adjacent to the top wall 106 of the cabinet 100. A pair of sidewalls 134 connect opposing ends of the bottom wall 130 and the top wall 132 to define a passage 136 extending through the chute 118 from the chamber 102 to an exterior of the cabinet 100. In the illustrated example, the passage 136 is substantially rectangular and configured to receive the container C therethrough with minimal clearance to minimize the escape of thermal energy from within the chamber 102.

As best shown in the cross-sectional view of FIG. 4, the bottom wall 132 of the chute 118 includes a substantially planar inner surface 138 configured to provide a sliding surface for the container C when the container C is ejected from the chamber 102, as discussed below. Accordingly, the inner surface 138 of the bottom wall 132 may be formed or coated with a low-friction material, such as Teflon® or the like.

As shown, the passage 136 of the chute 118 corresponds to a first end of a dispensing region RD of the chamber 102. In the illustrated example, where the chute 118 is formed adjacent to the top wall 106 of the chamber 102, the dispensing region RD also extends along the top wall 106 the front wall 108 to the rear wall 110. Generally, the dispensing region RD serves as a staging area for the containers C, where the distribution system 200 interfaces with the containers C to dispense the containers C through the chute 118.

Figure 4:
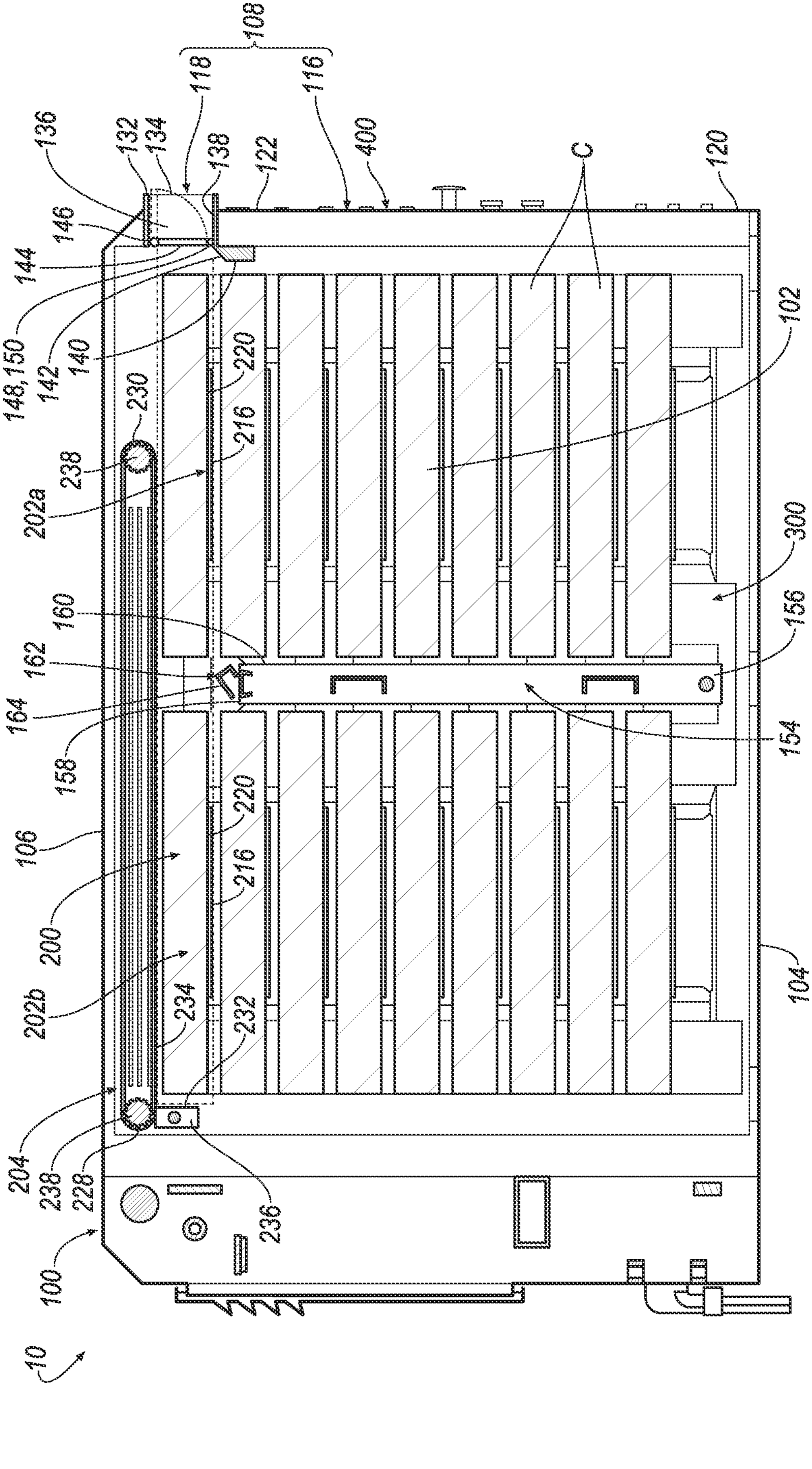
FIG. 4 is a cross-sectional view of the food management system of FIG. 2, taken along section line 4-4 in FIG. 2 and showing an arrangement of a distribution system according to the principles of the instant disclosure.

Referring still to FIG. 4, the chute 118 may include a lip 140 disposed within the chamber 102 adjacent to the bottom wall 132. The lip 140 includes an upper surface 142 formed substantially continuously with and at an oblique angle relative to the inner surface 138 of the bottom wall 132. Particularly, the upper surface 142 extends into the chamber 102 from the inner surface 138 of the chute 118 at a decline. Thus, the upper surface 142 is configured to provide a ramp surface at the interface between the chamber 102 and the passage 136 for guiding a leading edge of the container C into the passage 136 when the container C is ejected. Accordingly, the lip 140 prevents the container C from snagging at the interface between the chamber 102 and the passage 136.

The chute 118 includes a door 144 disposed within the passage 136. The door 144 is operable to selectively open and close the passage when the container C is ejected. Referring again to FIG. 4, a top end 146 of the door 144 is pivotally attached to the top wall 130 of the chute 118 whereby the door rotates about the top end 146 between an open position and a closed position, as indicated by the phantom line. A bottom end 148 of the door 144 may include an elongated seal 150 configured to interface with the inner surface 138 of the bottom wall 132 when the door 144 is in the closed position to minimize the escape of thermal energy from the chamber 102.

Referring again to FIGS. 2 and 3, the cabinet 100 may include a receptacle 152 configured to receive the access panel 116 when the access panel 116 is detached from the front wall 108 of the cabinet 100. As shown, the receptacle 152 defines a substantially rectangular cavity for receiving the access panel 116. The cabinet 100 may further include one or more anchors for securing the cabinet within a delivery vehicle.

Figure 3:
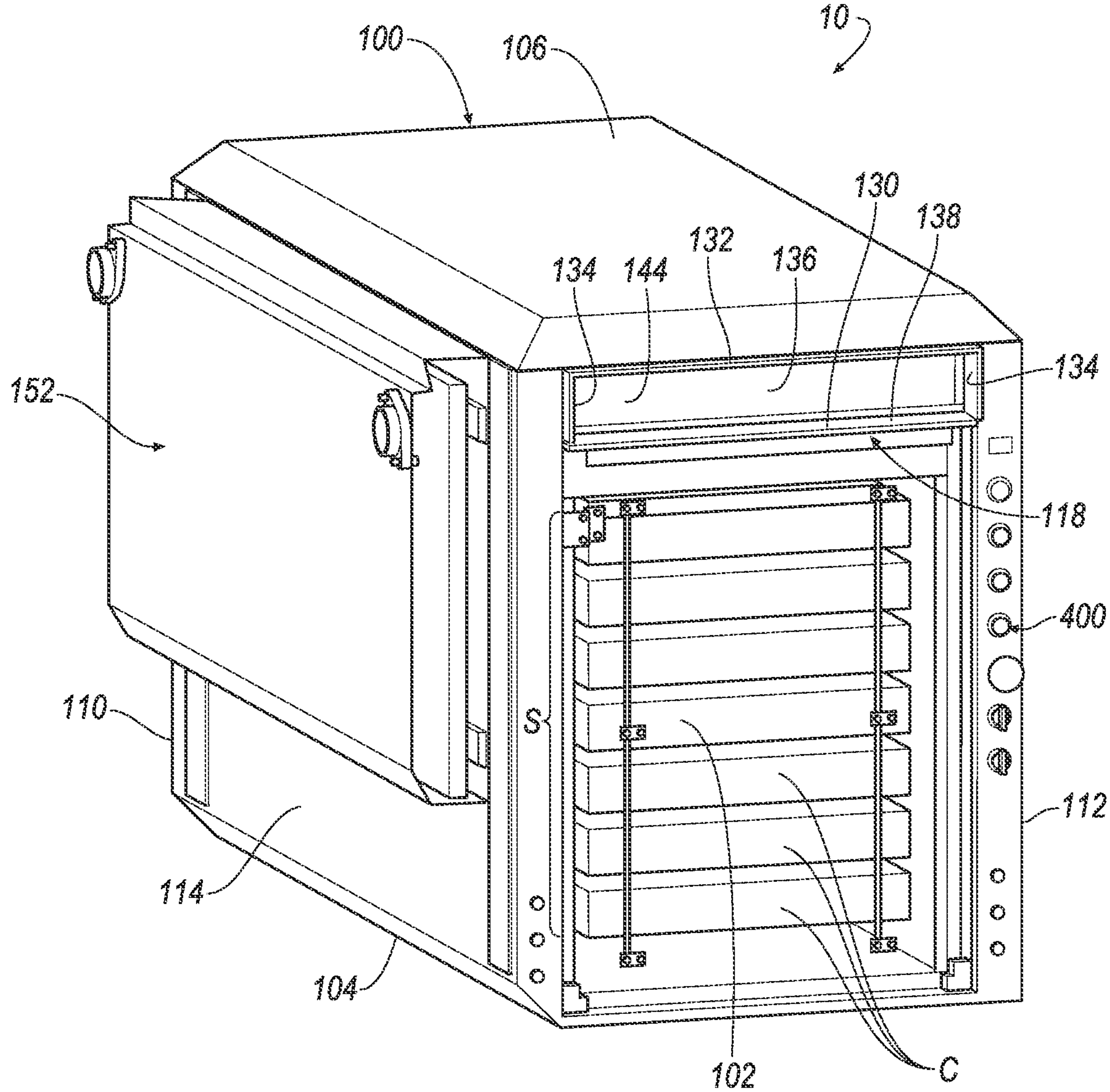
FIG. 3 is a perspective view of the food management system of FIG. 2, whereby an access panel has been removed from a front wall to expose a chamber of the food management system.
Figure 5:
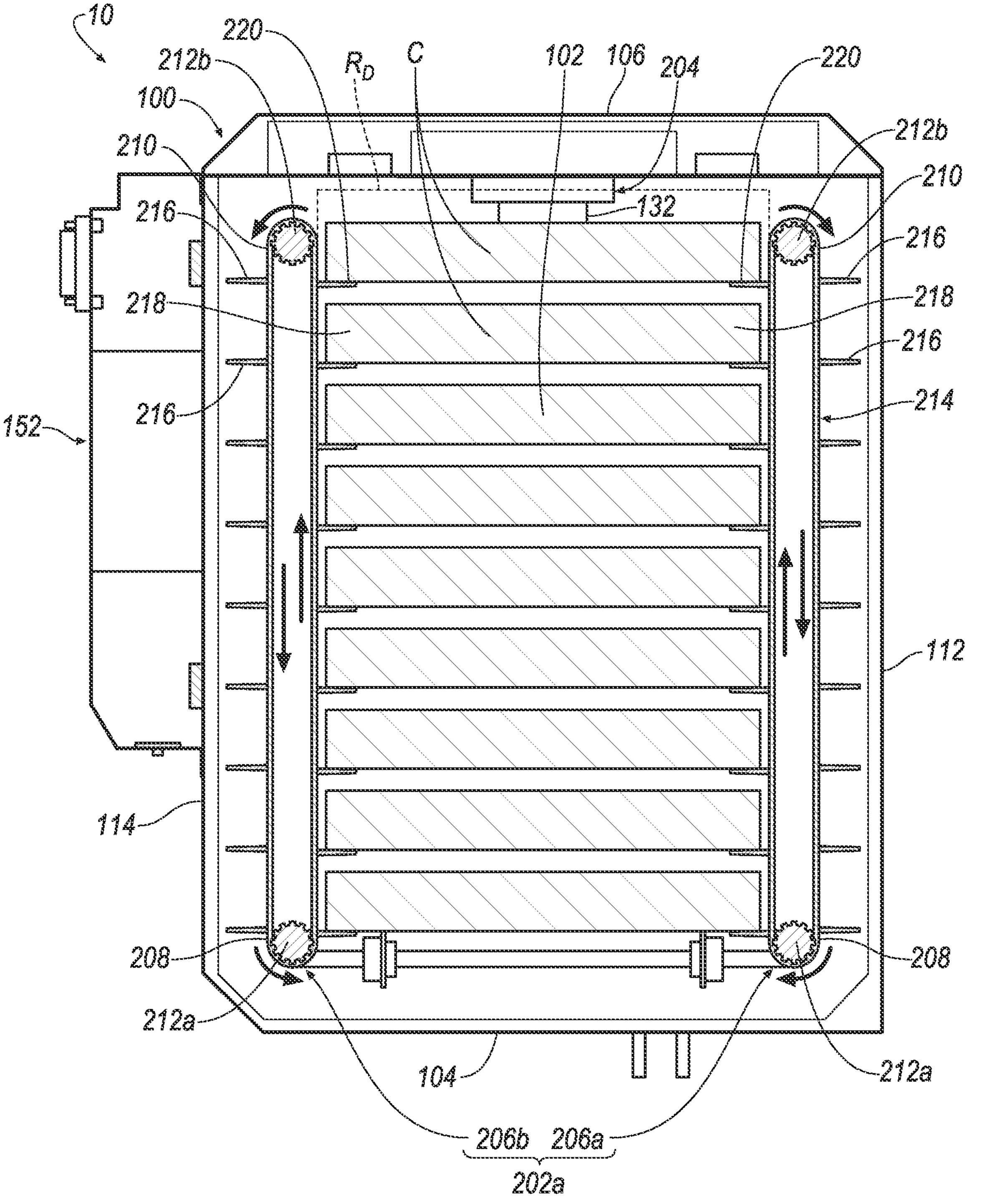
FIG. 5 is a cross-sectional view of the food management system of FIG. 2, taken along section line 5-5 in FIG. 2 and showing an arrangement of a distribution system according to the principles of the instant disclosure.

Turning now to FIGS. 3-5, the chamber 102 is configured to receive a plurality of articles of the container C. Generally, the chamber 102 is configured to receive and store one or more stacks S of the container C for distribution via the distribution system 200, as discussed below. Accordingly, the cabinet 100 includes various features and elements configured for maintaining stack integrity and ensuring proper translation of the container C within the chamber 102.

Figure 8:
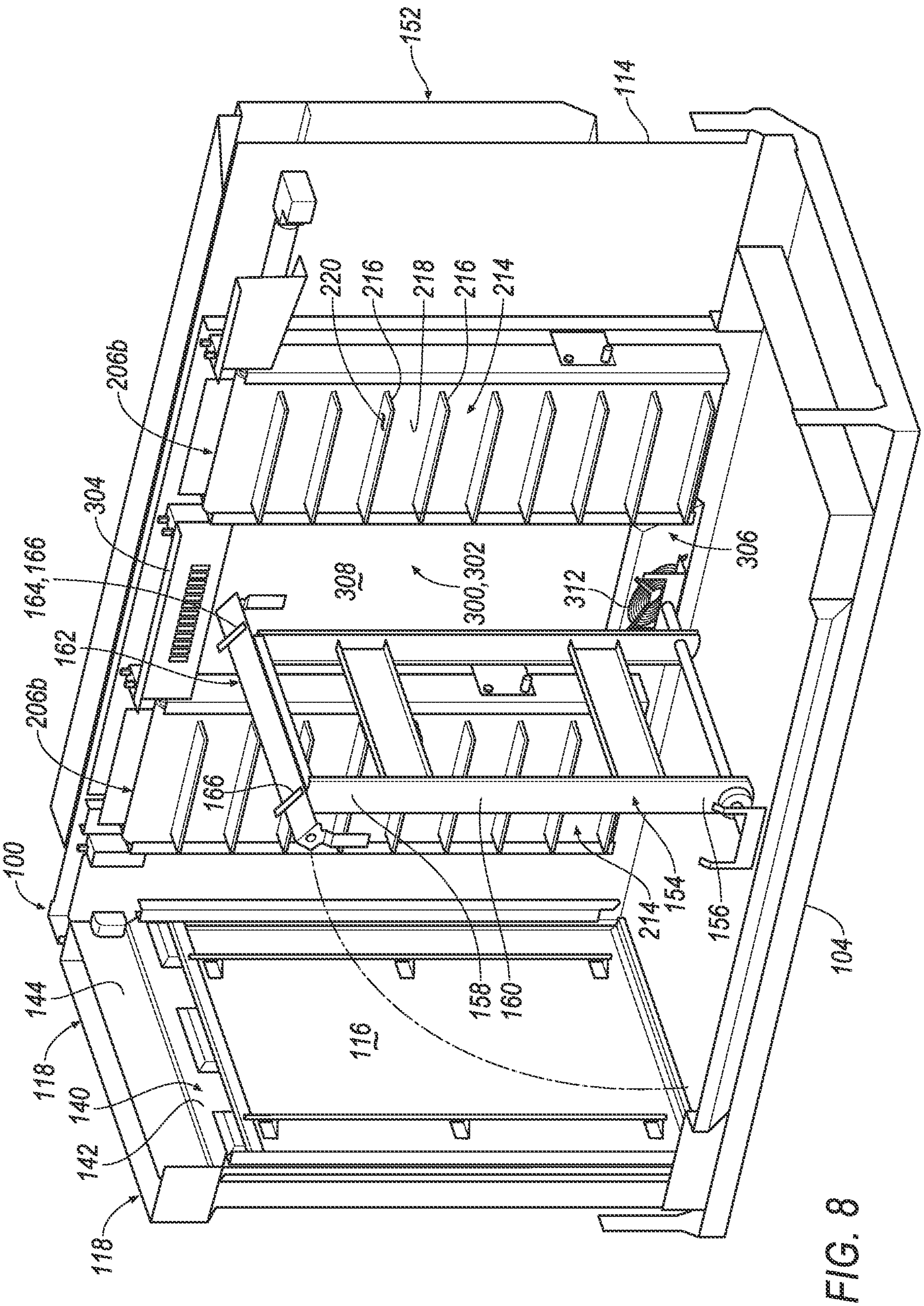
FIG. 8 is a top-left-rear perspective view of the food management system of FIG. 2, wherein a top wall, a left wall, and a rear wall of a cabinet of the food management system have been hidden, for clarity.

As best shown in FIG. 8, the cabinet 100 includes a gate 154 disposed between the front wall 108 and the rear wall 110. As shown, the gate 154 generally extends from a bottom end 156 adjacent to the base 104 of the cabinet 100 to a top end 158 adjacent to the top wall 106 of the cabinet 100. The bottom end 156 of the gate is rotatably attached to the cabinet 100 adjacent to the base 104, whereby the gate 154 is rotatable about the bottom end 156 between an upright position, parallel to the front and back walls 108, 110, and a lowered position, parallel to the base 104. The gate 154 includes at least one upright 160 extending from the bottom end 156 to the top end 158, which is configured to be disposed between adjacent stacks of the containers C to maintain separation and integrity of the stacks when the gate 154 is in the upright position. Conversely, the gate 154 may be moved to the lowered position adjacent to the base 104 to allow unobstructed access to a rear portion of the chamber 102.

Referring still to FIG. 8, the cabinet 100 further includes a guide rail 162 extending between the left wall 112 and the right wall 114. The guide rail 162 includes a top surface 164 that is inclined along a direction from the rear wall 110 to the front wall 108. In the illustrated example, the top surface 164 is includes one more slides 166 formed of or coated with a low friction material, such as ultra-high-molecular-weight polyethylene (UHMW), Teflon®, or the like. Accordingly, the top surface 164 of the guide rail 162 forms a ramp in an intermediate portion of the chamber 102. In use, the top surface 164 is configured to guide a leading edge of the container C when the container C is being transferred from a rear stack to a front stack.

Figure 7:
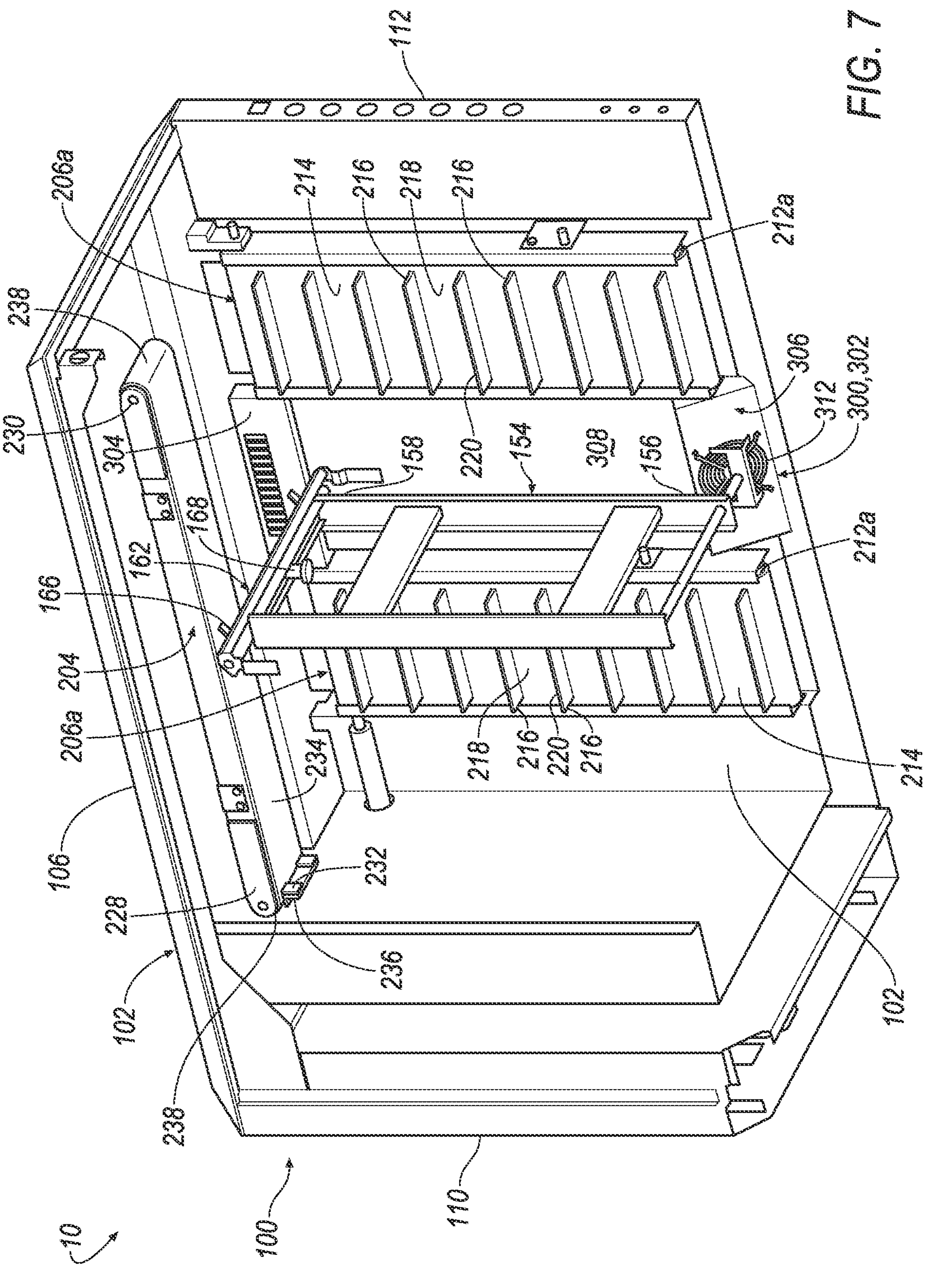
FIG. 7 is a bottom-right-front perspective view of the food management system of FIG. 2, wherein a base, a right wall, and a front wall of a cabinet of the food management system have been hidden, for clarity.

As shown in FIG. 7, the top end 158 of the gate 154 may interface with the guide rail 162 to releasably secure the gate 154 in the upright position. For example, the gate 154 may include a first portion of a latch 168 configured to interface with a corresponding portion of the latch (168) a bottom side of the guide rail 162.

Referring now to FIGS. 4-8, the distribution system 200 is disposed within the chamber 102 of the cabinet 100 and is configured to dispense the containers C therefrom. In the illustrated example, the distribution system 200 includes one or more lifts 202*a*, 202*b* configured to translate the containers C in a vertical direction, and an ejector 204 configured to manipulate the containers C towards the passage 136 of the chute 118. Generally, the lifts 202*a*, 202*b* are each operable to sequentially present containers C to the dispensing region RD of the chamber 102 whereby the containers C are aligned with the passage 136 of the chute 118. With the containers C staged in the dispensing region RD by the lifts 202*a*, 202*b*, the ejector 204 is operable to bias the containers of at least one of the lifts 202*a*, 202*b* towards the front wall 108 and through the passage 136.

In the illustrated example, the distribution system 200 includes a front lift 202*a* disposed between the front wall 108 and the gate 154, and a rear lift 202*b* disposed between the gate 154 and the rear wall 110. Thus, as discussed hereinabove, the gate 154 separates the front lift 202*a* and the rear lift 202*b* when the gate 154 is in the upright position. Each of the lifts 202*a*, 202*b* includes an opposing pair of elevators 206 configured to operate in unison to translate the container C in the vertical direction. For example, each lift 202*a*, 202*b* includes a left-side elevator 206*a* extending along the left wall 112 in a direction from the base 104 to the top wall 106, and a substantially similar right-side elevator 206*b* extending along the right wall 114 in a direction from the base 104 to the top wall 106. As shown in the cross-sectional view of FIG. 5, the left-side elevators 206*a* and the right-side elevators 206*b* of each of the respective lifts 202*a*, 202*b* are aligned with each other across the chamber 102. Accordingly, the left-side elevators 206*a* and the right-side elevators 206*b* of each lift 202*a*, 202*b* cooperate to provide stacks of the containers C, whereby the left-side elevator 206*a* supports respective left sides of a plurality of containers C and the right-side elevator 206*b* supports corresponding right sides of the plurality of containers C, as shown in FIG. 5.

Figure 9:
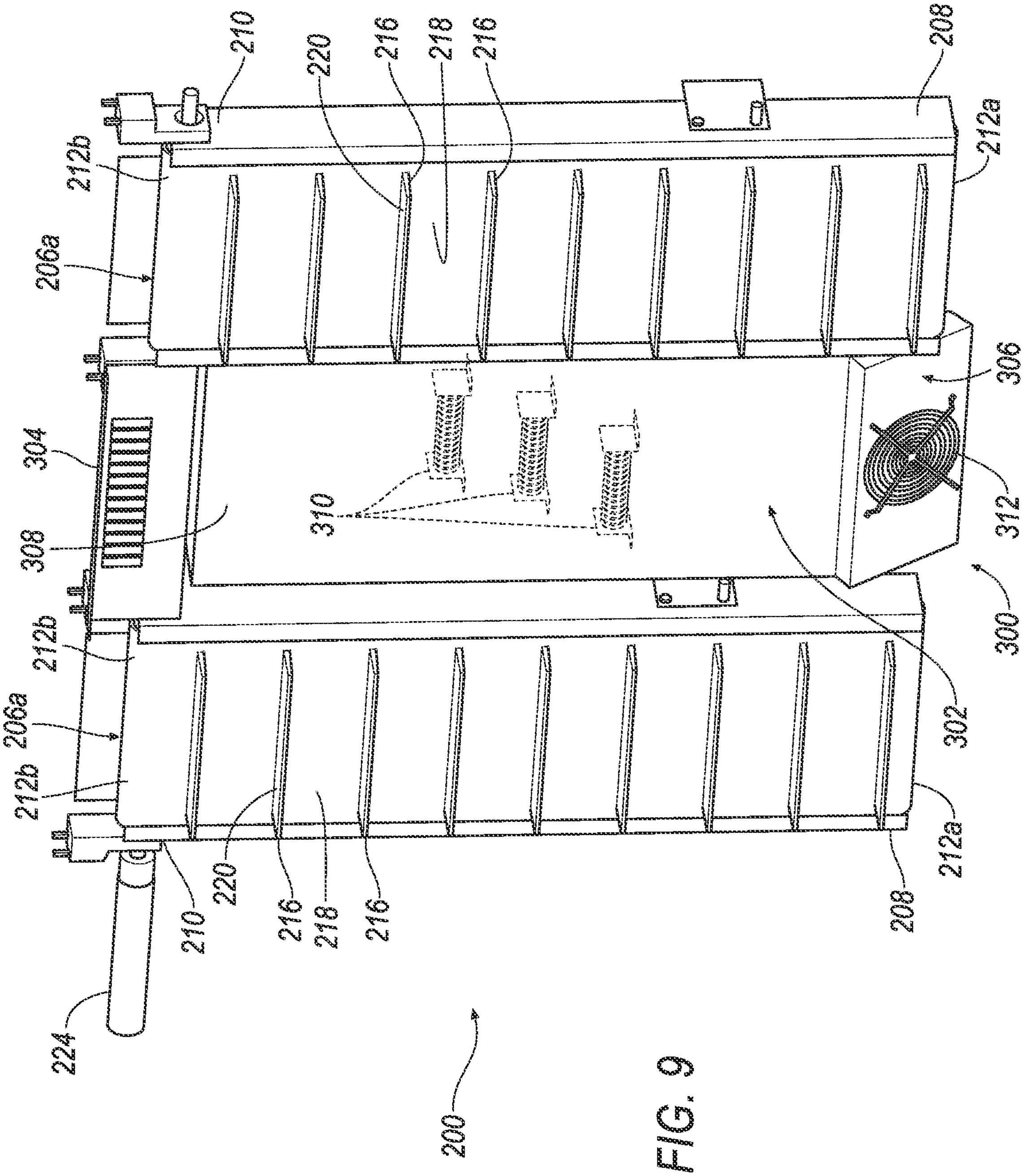
FIG. 9 is a fragmentary perspective view of a distribution system according to the principles of the present disclosure, showing a pair of elevators and a heating unit.
Figure 10:
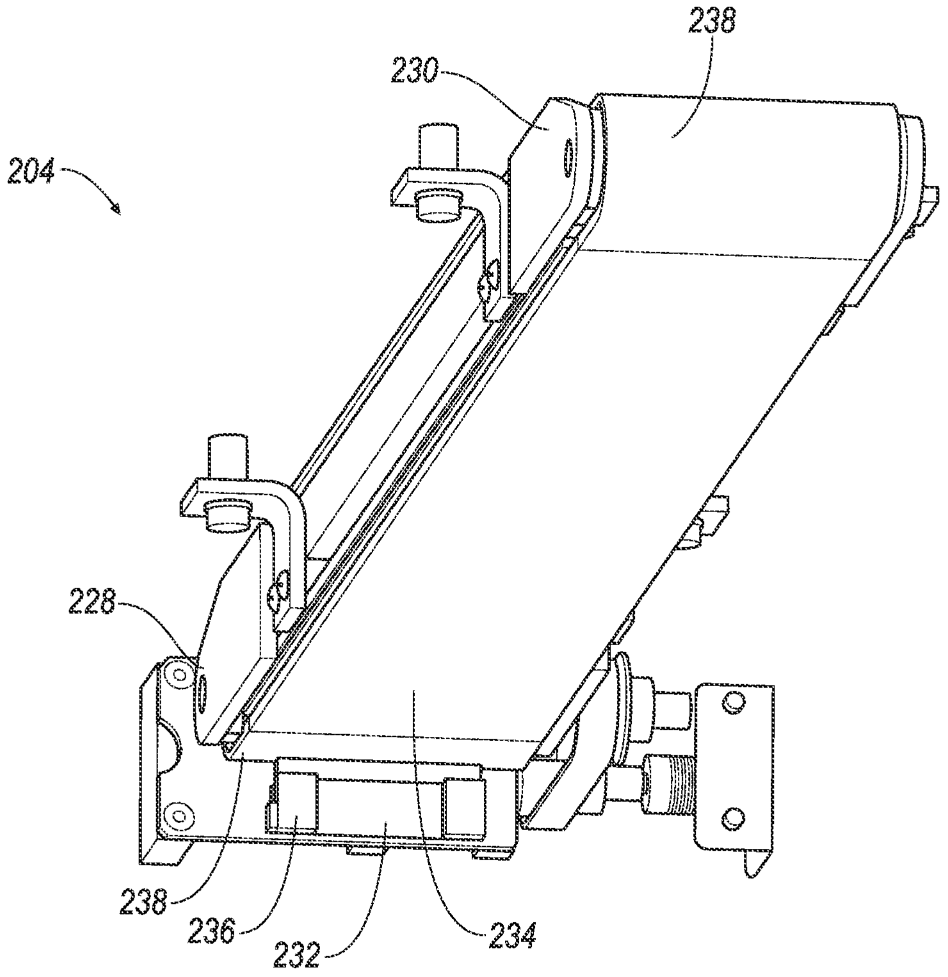
FIG. 10 is a perspective view of an ejector of the distribution system according to the present disclosure.

Turning now to FIG. 9, the respective left-side elevators 206*a* of the front and rear lifts 202*a*, 202*b* are illustrated. As discussed above, all of the elevators 206*a*, 206*b* are substantially similar, with the right-side elevators 206*b* being mirror images of the left-side elevators 206*a*. Accordingly, only the left-side elevators 206*a* are described here. Each of the elevators 206*a*, 206*b* extends from a first end 208 adjacent to the base 104 to a second end 210 adjacent to the top wall 106 and is configured as a paddle belt conveyor. Accordingly, each elevator 206*a*, 206*b* includes a lower pulley 212*a* at the first end 208, an upper pulley 212*b* at the second end 210, and a continuous conveyor belt 214 extending around the pulleys 212*a*, 212*b*, as best shown in FIG. 5. The belt 214 includes a plurality of paddles 216 extending outwardly therefrom. As shown, the paddles 216 are evenly spaced from each other along a length of the belt 214 to define a plurality of slots 218 for receiving the containers C therebetween. Each of the paddles 216 includes a support surface 220 configured to receive the container thereon. As shown in FIG. 5, the support surfaces 220 of paddles 216 on the left-side elevator 206*a* are vertically aligned with corresponding paddles 216 on the right-side elevator 206*b*, whereby the slots 218 defined by the paddles 216 of the left side-elevator 206*a* cooperate with the slots 218 defined by the paddles 216 of the right-side elevator 206*b* to receive individual ones of the containers C.

As shown in FIGS. 4 and 5, the paddles 216 of the lifts 202*a*, 202*b* can be translated vertically through the chamber 102 to present the containers C into the dispensing region RD. For example, in the illustrated example, inward facing paddles 216 of each elevator 206*a*, 206*b* travel in a direction from the base 104 towards the top wall 106 when belts 214 are rotated in a first direction, as indicated by the directional arrows in FIG. 5. The support surfaces 220 of the paddles 216 closest to the top wall 106 cooperate to define support surfaces 220 of the dispensing region RD along which the containers C may slide when biased by the ejector 204 towards the passage 136.

Figure 6:
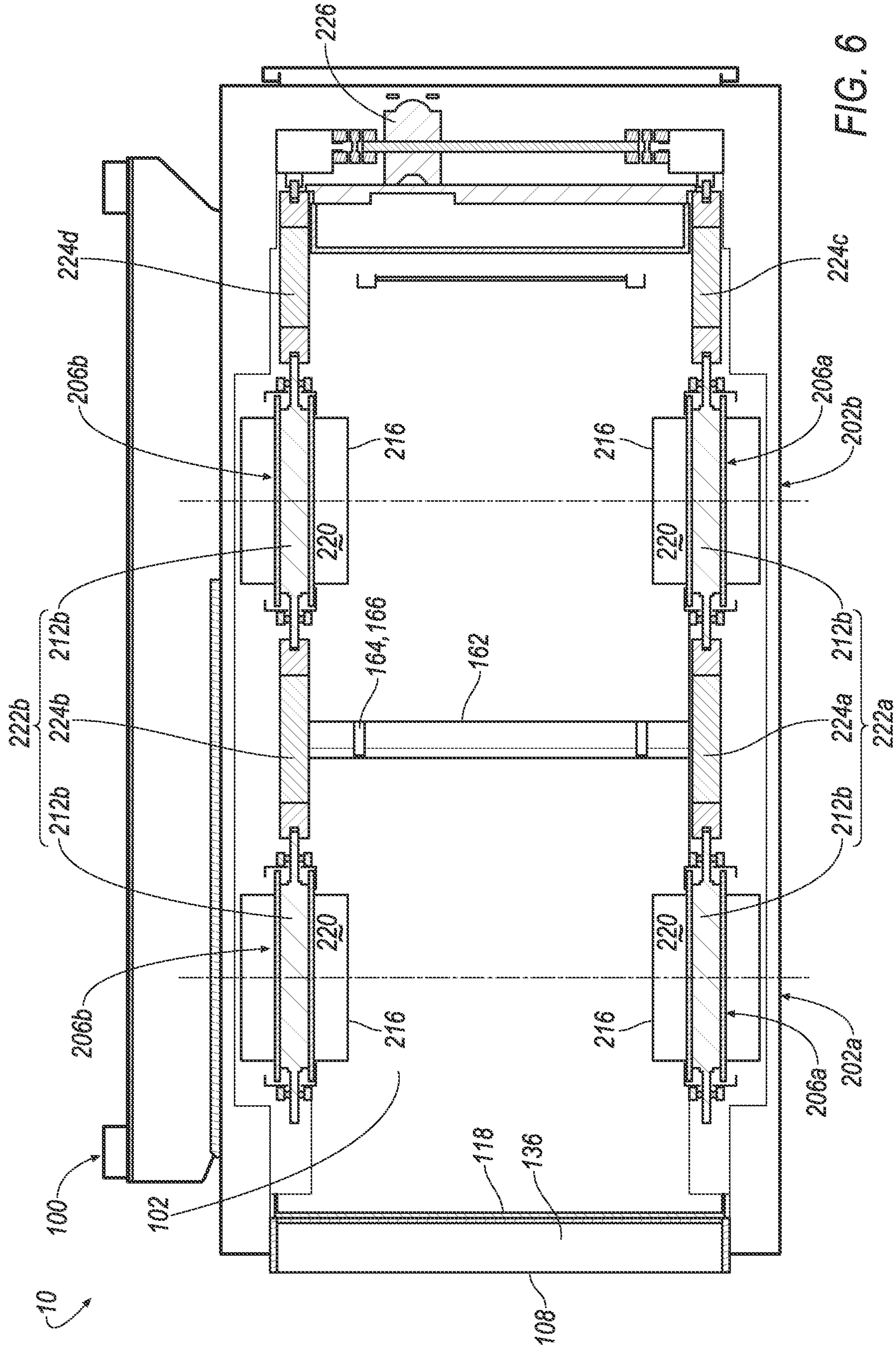
FIG. 6 is a cross-sectional view of the food management system of FIG. 2, taken along section line 6-6 in FIG. 2 and showing an arrangement of a distribution system according to the principles of the instant disclosure.

Referring to FIG. 6, a cross-sectional view taken through the upper pulleys 212*b* of the elevators lifts 202*a*, 202*b* is provided. As shown, the upper pulleys 212*b* of the left-side elevators 206*a* are part of a first driveline 222*a* and are connected to each other by a first coupler 224*a*, whereby the pulleys 212*b* are rotationally fixed with respect to each other. Likewise, the upper pulleys 212*b* of the right-side elevators 206*b* are part of a second driveline 222*b* and are connected to each other by a second coupler 224*b*, whereby the pulleys 212*b* are rotationally fixed with respect to each other. The first driveline 222*a* and the second driveline 222*b* are both connected to a single motor 226 by respective couplers 224*c*, 224*d*. Accordingly, because the upper pulleys 212*b* of each of the elevators 206*a*, 206*b* is mechanically coupled to a common motor 226, all of the elevators 206*a*, 206*b* operate synchronously, whereby the left-side elevators 206*a* and right-side elevators 206*b* move at the same speed, and the front left 202*a* and the rear lift 202*b* move at the same speed. In other examples, each of the front lift 202*a* and the rear lift 202*b* may be independently powered, whereby the front lift 202*a* can be advanced and reversed independent of the rear lift 202*b*, and vice versa. Furthermore, each of the elevators 206*a*, 206*b* may be independently powered and controlled.

As shown in FIG. 7, the distribution system 200 further includes the ejector 204 disposed along the top wall 106 and extending from a first end 228 at the rear wall 110 to a second end 230 adjacent to the front wall 112. Generally, the ejector 204 is configured to interface with the lifts 202*a*, 202*b* in the dispensing region RD to bias articles of the container C disposed within the dispensing region RD towards the chute 118 during a dispensing process, as described in greater detail below.

The ejector 204 of the illustrated example includes a bumper 232 suspended from the top wall 106 into the dispensing region RD and operable between a retracted position at the first end 228 of the ejector 204 and an extended position at the second end 230 of the ejector 204. Accordingly, the ejector 204 is configured to translate the bumper 232 along a linear path from the rear wall 110 towards the front wall 108. In one example, the bumper 232 is attached to a belt 234 by a carriage 236, whereby the belt extends continuously around a pair of pulleys 238 disposed at the opposing ends 228, 230 of the ejector 204. Thus, when the belt 234 rotates in a first direction, the bumper 232 moves towards the extended position, and when the belt 234 rotates in an opposite second direction, the bumper 232 moves towards the retracted position. In other examples, the bumper 232 may be linearly translated by other means, such as linear screws, cylinders, or the like.

As shown in FIGS. 7 and 8, the warmer 300 includes an opposing pair of heating units 302 configured to maintain the chamber 102 at a uniform and desired temperature. Particularly, FIG. 7 shows a first one of the heating units 302 disposed on the left wall 112 between the left-side elevators 206*a* of the front and rear lifts 202*a*, 202*b*. Similarly, FIG. 8 shows a second one of the heating units 302 disposed on the right wall 114 between the right-side elevators 206*b* of the front and rear lifts 202*a*, 202*b*. Accordingly, the chamber 102 is provided with the heating units 302 on opposite sides and in a position substantially centered between the front of the chamber 102 and the rear of the chamber 102.

With reference to FIG. 9, an example of one of the heating units 302 is provided in association with the elevators 206*a* of the left side of the chamber 102. The heating unit 302 on the right side of the chamber 102 is substantially the same as the illustrated heating unit 302. Each of the heating units 302 includes an intake 304 disposed adjacent to the top wall 106 and an exhaust 306 disposed adjacent to the base 104. The exhaust 304 is in direct fluid communication with the intake 306 via a heating duct 308, which includes a plurality of heating elements 310 disposed therein.

As shown, the intake 304 of each of the heating units 302 is disposed adjacent to the top wall 106. The intake 304 may be provided with a grill having a plurality of louvers oriented for evenly distributing air along the top wall 106. The exhaust 306 is disposed at the opposite end of the heating duct 308 from the exhaust 304 and is configured to pull air from the intake 304 through the heating duct 308 and to push the air along the base 104 of the chamber 102. The exhaust 306 is oriented at an oblique angle with respect to the base 104, whereby the exhaust 306 is angled towards the base 104 and faces towards the opposing wall of the chamber 102. The exhaust 306 includes a fan 312 configured to pull the air into the heating unit 302 from top wall 106 of the chamber 102. Although described as pulling air from the top of the chamber 102 and exhausting the heated air at the bottom of the chamber 102, the direction of airflow may be reversed to pull air from the bottom of the chamber 102, up through the heating duct 308, and to exhaust the heated air at the top of the chamber 102.

As shown in FIG. 9, a plurality of the heating elements 310 may be disposed within the heating duct 308 to progressively heat a flow of air as it passes from the intake 304 to the exhaust 306. In the illustrated example, the heating elements 310 are sequentially arranged along a length of the heating duct 308 in the direction from the intake 304 to the exhaust 306, and are staggered or offset from each other along a width of the heating duct 308. Accordingly, portions of the airflow through the heating duct 308 are distributed among each of the heating elements 310, thereby maximizing heating efficiency.

As shown in FIG. 1, the interaction with and operation of the food management system 10 are facilitated by a control system 400. The control system includes one or more processors 402, a memory 404, a communication unit 406, and an input/output module 408. Each of components 402, 404, 406, 408 may be interconnected (physically, communicatively, and/or operatively) by communication channels for inter-component communications. The control system 400 may further include an operating system 410 that is executable by the one or more processors 402.

The processors 402, in one example, are configured to implement functionality and/or process instructions for execution within the control system 400. For example, the processors 402 may be capable of processing instructions stored in memory 404 for manipulating the distribution system 200 and/or controlling the warmer 300. Examples of the processors 402 may include, any one or more of a microprocessor, a controller (e.g. programmable logic controller), a digital signal processor (DSP), an application specific integrated circuit (ASIC), a field-programmable gate array (FPGA), or equivalent discrete or integrated logic circuitry.

The memory 404, in one example, is configured to store information within control system 400 during operation. The memory 404, in some examples, is described as a non-transitory computer-readable storage medium comprising memory hardware. In some examples, the memory 404 is used to store program instructions for execution by processors 402. The memory 404, in one example, is used by software or applications running on control system 400 to temporarily store information during program execution.

The control system 400, in some examples, also includes a communication unit 406. The control system 400, in one example, utilizes the communication unit 406 to communicate with external devices via one or communication channels, such as one or more wired and/or wireless networks. The communication unit 406 may be a network interface card, such as an Ethernet card, an optical transceiver, a radio frequency transceiver, or any other type of device that can send and receive information. Other examples of such communication unit 406 may include cellular and WiFi radios. In some examples, control system 400 utilizes the communication unit 406 to wirelessly communicate with external devices, such as user devices 16.

The control system 400, in one example, also includes an input/output module 408 including input devices and output devices of the control system 400. The input devices, in some examples, are configured to receive inputs from an operator of the food management system 100 through tactile, audio, or video feedback. Examples of input devices include buttons, a presence-sensitive screen, a mouse, a keyboard, a voice responsive system, video camera, microphone or any other type of device for detecting a command from an operator. One or more output devices may also be included in the control system 400. The output devices, in some examples, are configured to provide output to a user using tactile, audio, or video stimuli. The output device, in one example, includes a presence-sensitive screen, a sound card, a video graphics adapter card, or any other type of device for converting a signal into an appropriate form understandable to humans or machines. Additional examples of output devices include a speaker, a cathode ray tube (CRT) monitor, a liquid crystal display (LCD), or any other type of device that can generate intelligible output to an operator.

The control system 400 may include an operating system 410. The operating system 410, in some examples, controls the operation of components of control system 400. For example, the operating system 410, in one example, facilitates the interaction of one or more applications and/or modules with processors 402, memory 404, communication unit 406, and input/output module 408.

Referring again to FIG. 1, the food distribution environment 1000 includes a plurality of users 14 each associated with one or more user devices 16. The user devices 16 are configured to communicate with the food management system 10 via the communication unit 406 of the control system 400. The user devices 16 may include personal computers, tablets, mobile phones, or any other device capable of providing a user interface and communicating with the food management system 10.

Generally, the cabinet 100 is configured to store a plurality of the containers C on each of the lifts 202*a*, 202*b*, whereby the lifts 202*a*, 202*b* sequentially present at least one of the containers C to the dispensing region RD adjacent to the top wall 106 of the cabinet 100, whereby the ejector 204 can bias the at least one of the containers C through the passage 136 of the chute 118 for retrieval by one of the users 14. The user 14 may interact with the cabinet 100 via the communication module 406 using one of the user devices 16, or may interface directly with the cabinet 100 using the input/output module 408. For example, the user 14 may initiate and process a transaction using the user device 16 and then request that the container C be dispensed from the cabinet 100 using the input/output module 408.

In operation, the containers C are initially loaded into the cabinet 100 through the front wall 108 by removing the access panel 116. As discussed above, the gate 154 of the cabinet 100 is operable between an upright position and a lowered position, whereby the gate 154 separates the front lift 202*a* and the rear lift 202*b* when it is in the upright position and allows access to the rear lift 202*b* when it is the lowered position. Accordingly, during loading of the cabinet 100, the gate 154 is moved to the lowered position to allow containers C to be loaded into the rear lift 202*b*.

As discussed above, the front and rear lifts 202*a*, 202*b* may be synchronously driven by a single motor 226. Accordingly, the containers C may be loaded into the respective slots 218 of the front and rear lifts 202*a*, 202*b* in a manner that will allow the front and rear lifts 202*a*, 202*b* to continuously present at least one container C to the ejector 204 for dispensing. In alternative examples, the front and rear lifts 202*a*, 202*b* may be independently powered, whereby containers from a single one of the lifts 202*a*, 202*b* can be presented to the ejector 204 without advancing the other one of the lifts 202*a*, 202*b*.

Each of the slots 218 may be serialized with an identification number, whereby unique types or combinations of containers C can be loaded into each of the slots 218 and tracked by the control system 400. For example, the front lift 202*a* may be provided with containers C having customized ingredients ordered by customers, whereby the containers C are arranged on the front lift 202*a* based on a scheduled vehicle delivery sequence, while the rear lift 202*b* may be provided with a plurality of containers C having predetermined and standard ingredients that can be purchased directly from the food management system 10.

When the user 14 desires one or more of the containers C from the cabinet 100, a dispense request may be submitted to the cabinet via the control system 400 using one of the user devices 16 or the input/output module 408. The control system 400 then determines which of the lifts 202*a*, 202*b* includes the desired container C and advances the respective lifts 202*a*, 202*b* towards the top wall 106 to be presented to the ejector 204. With the desired container C lifted into the dispensing region RD, the controller 400 instructs the ejector 204 to move the bumper 232 from the retracted position at the first end 228 of the ejector 204 to the extended position at the second end 230 of the ejector to bias the container towards the chute 118. As the containers C are dispensed from the cabinet 100, bottom surfaces of the containers C may pass over the top surface 164 of the guide rail 162 and the upper surface 142 of the lip 140.

In one example, only the front lift 202*a* presents a container C to the ejector 204. Here, the bumper 232 may be initially provided in an intermediate position between the first end 228 and the second end 230, and more specifically between the front lift 202*a* and the rear lift 202*b*. To dispense the container C from the front lift 202*a*, the bumper 232 is moved towards the extended position, whereby the bumper 232 contacts a rear facing surface of the container C to bias the container C towards the chute 118. A leading edge or surface of the container C may pass over the upper surface 142 of the lip 140 to be guided into the passage 136. As the container enters the passage 136, the door 144 may be opened automatically (i.e. the door is independently powered and controlled), or may be a passive door 144 that is biased to the open position by the leading edge of the container C. Once the container C is dispensed, the ejector 204 returns the bumper 232 to either the intermediate position or the retracted position and the lifts 202*a*, 202*b* are advanced to present a subsequent container C to the ejector 204.

In another example, only the rear lift 202*b* presents a container to the ejector 204. Here, the bumper 232 is initially provided in the retracted position. To dispense the container C from the rear lift 202*b*, the bumper 232 is moved towards the extended position, whereby the bumper 232 contacts a rear facing surface of the container C to bias the container C towards the chute 118. Because the container C is being dispensed from the rear lift 202*b*, a leading edge or surface of the container C may first pass over the top surface 164 of the guide rail 162, whereby the leading edge of the container C is guided onto the upper support surfaces 220 of the front lift 202*a*. From there, the bumper 232 biases the container C over the upper surface 142 of the lip 140 and into the passage 136. As the container C enters the passage 136 the door 144 may be opened automatically (i.e. the door is independently powered and controlled), or may be a passive door 144 that is biased to the open position by the leading edge of the container C. Once the container C is dispensed, the ejector 204 returns the bumper 232 to either the intermediate position or the retracted position and the lifts 202*a*, 202*b* are advanced to present a subsequent container C to the ejector 204.

In some examples, both of the lifts 202*a*, 202*b* may present containers C to the ejector 204 simultaneously. Here, the bumper 232 may bias the container C of the rear lift 202*b* towards the chute 118. Consequently, the container C of the rear lift 202*b* is moved across the guide rail 162 and contacts the container C of the front lift 202*a*. Accordingly, the containers C of the front lift 202*a* and the rear lift 202*b* are simultaneously biased towards the chute 118 by the ejector 204. In some examples, both of the containers C may be dispensed in a single transaction. Alternatively, only the container C of the front lift 202*a* may be dispensed, while the container C of the rear lift 202*b* is merely repositioned to the front lift 202*a* and can be dispensed in a separate transaction.

When the containers C are loaded into the chamber 102, the warmer 300 is configured to provide uniform and continuous temperature control by circulating warmed air throughout the chamber 102. Particularly, by providing heating units 302 on opposing sides of the chamber 102, whereby each of the heating units 302 pulls air from the bottom of the chamber 102 and exhausts heated air at the top of the chamber 102.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

What is claimed is:

1. A food management system comprising:

a cabinet having a chamber and a chute, the chute defining a passage extending from the chamber to an exterior of the cabinet;

at least one lift disposed within the chamber, the lift including a plurality of slots configured to receive a plurality of containers therein and operable to present at least one of the containers to a dispensing region of the cabinet through a translation of the plurality of containers; and an ejector operable to eject the at least one of the containers presented to the dispensing region from the at least one lift through the chute.

2. The food management system of claim 1, wherein the at least one lift includes a first lift disposed adjacent to a front wall of the cabinet and a second lift disposed on an opposite side of the first lift from the front wall.

3. The food management system of claim 2, further comprising a gate disposed between the first lift and the second lift.

4. The food management system of claim 2, wherein the first lift includes a first elevator having a first plurality of slots and a second elevator opposing the first elevator and including a second plurality of slots, whereby each of the first plurality of slots cooperates with one of the second plurality of slots to receive one of the containers.

5. The food management system of claim 4, wherein each of the first elevator and the second elevator is a conveyor belt including a plurality of paddles defining a support surface of one of the slots.

6. The food management system of claim 1, wherein the ejector includes a belt and a bumper attached to the belt.

7. The food management system of claim 1, wherein the chute is disposed at a first end of a front wall adjacent to a top wall of the cabinet and defines the passage through the front wall configured to receive one of the containers therethrough.

8. The food management system of claim 1, further comprising a warmer disposed within the chamber.

9. The food management system of claim 8, wherein the warmer includes a first heating unit and a second heating unit disposed opposite of the first heating unit, each of the first heating unit and the second heating unit including an outlet adjacent to a base of the cabinet and an intake adjacent to a top wall of the cabinet, whereby the intake and the outlet of the first heating unit oppose the intake and the outlet of the second heating unit.

10. The food management system of claim 1, wherein the chute is disposed along a front wall of the cabinet, the front wall including a removable access panel.

11. A food management system comprising:

a cabinet having a chamber and a chute, the chute defining a passage extending from the chamber to an exterior of the cabinet;

at least one lift disposed within the chamber, the lift including a plurality of slots each configured to receive a container therein, the slots operable to translate the containers into a dispensing region of the cabinet, whereby one of the slots defines a support surface of the dispensing region; and an ejector including a bumper operable to translate through the dispensing region to bias the container of the at least one lift and in the dispensing region towards the chute.

12. The food management system of claim 11, wherein the at least one lift includes a first lift disposed adjacent to a front wall of the cabinet and a second lift disposed on an opposite side of the first lift from the front wall.

13. The food management system of claim 12, further comprising a gate disposed between the first lift and the second lift.

14. The food management system of claim 12, wherein the first lift includes a first elevator having a first plurality of slots and a second elevator opposing the first elevator and including a second plurality of slots, whereby each of the first plurality of slots cooperates with one of the second plurality of slots to receive the container.

15. The food management system of claim 14, wherein each of the first elevator and the second elevator is a conveyor belt including a plurality of paddles defining a support surface of one of the slots.

16. The food management system of claim 11, wherein the ejector includes a belt the bumper attached to the belt.

17. The food management system of claim 11, wherein the chute is disposed at a first end of a front wall adjacent to a top wall of the cabinet and defines the passage through the front wall configured to receive the container therethrough.

18. The food management system of claim 11, further comprising a warmer disposed within the chamber.

19. The food management system of claim 18, wherein the warmer includes a first heating unit and a second heating unit opposite of the first heating unit, each of the first heating unit and the second heating unit including an outlet adjacent to a base of the cabinet and an intake adjacent to a top wall of the cabinet, whereby the intake and the outlet of the first heating unit oppose the intake and the outlet of the second heating unit.

20. The food management system of claim 11, wherein the chute is disposed along a front wall of the cabinet, the front wall including a removable access panel.

* * * * *